Patented Sept. 4, 1951

2,566,828

UNITED STATES PATENT OFFICE 2,566,828

CERAMICALLY BONDED DIAMOND ABRASIVE PRODUCTS

Sidney Reed De Laney, Rutherford, N. J., assignor to Raybestos-Manhattan, Inc., Passaic, N. J., a corporation of New Jersey No Drawing. Application May 17, 1947, Serial No. 748,837

6 Claims. (Cl. 51—308)

1

This invention relates to ceramically bonded diamond abrasive products such as abrasive wheels.

The manufacture and use of diamond abrasive products such as abrasive wheels present certain problems not encountered in the manufacture of abrasive products using other abrasives such as aluminous oxide, silicon carbide and the like. Being harder than any known substance, the potential abrading life of diamond abrasives is longer. Being much more expensive than other abrasives, they must be used for the sake of economy in such a manner as to take advantage of their longer potential abrading life. Therefore, the bond that is used for the bonding of the diamond abrasive particles must function to hold the diamond abrasive particles in place until the abrasive particles are dulled by use. The efficiency of the bond used is to a large extent determined by its ability to wet the diamond particles in the manufacture of the abrasive product. Accomplishing this is very difficult due to the fact that the surfaces of the diamond are not readily wetable.

Where a ceramic bond is employed as the bond for the diamond abrasive particles, another difficulty is encountered in the manufacture of the abrasive product due to the tendency of diamonds to "graphitize" at the high temperatures employed for maturing the bond. Diamond particles "graphitize" when heated for any extended period at a temperature of 1400° F. and graphitize more readily at higher temperatures. This has necessitated the use of expensive firing procedures in the manufacture of ceramically bonded diamond abrasive products which consist of firing the same at high temperatures in an inert gas. Where it has been attempted to use a ceramic bond which may mature below the "graphitizing" temperatures of the bond, such a high percentage of fluxes have had to be used that their behavior during firing caused undesirable slumping to take place.

In the use of known ceramically bonded diamond abrasive products, constant dressing of the product is necessitated due to the considerable amount of "loading" that occurs. This dressing precludes the fullest possible economical use of the abrasive product due to the facts that the wheel is worn away by the dressing tool and a loss in man-hours results which over a period of time may be quite substantial.

In the manufacture of ceramically bonded diamond abrasive products, the prior art teaches in general the use of ceramic bonds consisting of clays or silicates in conjunction with a flux such as borax or feldspar, which in the matured abrasive product provide a glassy boro-silicate bond or a porcellanic bond. The objections to this type of bond are twofold:

Firstly, the boro-silicate or porcellanic bonds without exception require firing, fusing or maturing temperatures well in the range of those which graphitize the diamond particles, graphitization of the diamond particles taking place between temperatures of from 1400° F. to 2000° F. While such graphitization of the diamond particles is relatively slow at the lower stated temperature, nevertheless appreciable damage is done even at this lower part of the range because the firing or fusing is a time consuming cycle, generally requiring days. At temperatures close to 2000° F. the graphitization is rapid, taking merely a matter of hours. In order to avoid graphitizing the diamond particles when such bonds are used, it has been proposed to fuse and fire such products in an inert atmosphere. This procedure, however, requires expensive special equipment and furnaces.

Secondly, the boro-silicate or porcellanic bonds, because of the substantially complete fusion of the silicates with the fluxes that takes place, are extremely hard; and while they may prove very satisfactory for other abrasives such as aluminum oxide, they are not satisfactory for bonding diamond abrasive particles, the reason for this being that the volumetric proportion of abrasive particles when using diamonds is such that the bond itself can be and even is greater by volume than the abrasive itself. The result is that the high volumetric proportion of extremely hard binder produces an article that is slow in cutting. By contrast, where a cheaper abrasive such as aluminum oxide is used, the volume of such abrasive is preponderant and a hard bond is a necessity for proper durability and cutting qualities.

As a consequence of this second mentioned objection and in order to increase the cutting ability of diamond abrasive wheels bonded with such hard binders, it has been proposed to include in the abrasive wheel structure prior to firing, a relatively high percentage of combustible material in fairly coarse particle size, and rely upon the carbonization of such combustible material during firing to provide pore space and, therefore, reduce the volumetric proportion of hard bond and at the same time provide chip and cooling voids for freer cutting. Such combustible materials which have been used for this purpose are walnut shell flour, sawdust, coke, or indeed any organic material which has sufficient strength to hold its form during the forming and shaping of the abrasive product and which will remain dispersed in discrete particle size throughout the mass prior to firing. During the firing cycle, these organic particles are carbonized and burnt out, leaving small holes or voids in their place. This solution for increasing the cutting properties of such abrasive wheels while successful for that purpose, presents, however, another disadvantage, namely, the fact that diamond bonded abrasive wheels are used for cutting cemented carbides, and it is well known in the art that these carbides when ground instead of forming slivers or curls of metal are reduced to an impalpable fine powder, which loads up the clearance pores in such wheels. Due to this loading, the wheel slows up in its cutting character and if it is not suitably dressed, this condition may reach the point where the wheel practically ceases to cut, and if forced at this point the heat generated ruptures the wheel. It is this dressing that precludes the fullest possible economic use of these wheels as has been pointed out above.

The solution of these interrelated problems and the encountered difficulties is, ideally, providing a binder possessing the following properties or characteristics:

(1) A bond which can be fully matured at temperatures below the graphitization temperatures of the diamond particles.

(2) A binder having just the right hardness to provide uniform fast cutting properties without recourse to adding combustible materials to reduce the volumetric proportion of the bond (with its consequent loading and degrading of the cutting properties).

(3) Such a bond which also has the property of wetting the diamond particles while in the fused state so that the fullest benefit may be had of the expensive diamond particles during grinding without danger of dislodging (before they have accomplished their full grinding function).

I have found that the ceramically bonded diamond abrasive product of my present invention effectively satisfies or fulfills these stated requirements for the solution considered ideal, and that there is at the same time and as a consequence produced a diamond abrasive product which has the property of extreme fast cutting over the period of the life of the diamond abrasive and that this desired cutting property is obtainable with approximately half the volumetric proportion of the diamond abrasive particles which is normally necessary to use with ceramic bonds employed in the prior art.

The ceramic bond of the present invention maturing at a temperature below the graphitization temperatures of the diamond abrasive particles (which latter is taken at 1400° F.) comprises a vitrified hard glass portion which is vitrifiable at temperatures below such graphitization temperatures and an unvitrified insoluble silicate portion. The insoluble silicate portion is vitrifiable at temperatures substantially above said graphitization temperatures and is, therefore, in an unvitrified state at the maturation temperature of the ceramic bond. In the matured product the unvitrified insoluble silicate portion forms a matrix for the vitrified hard glass portion and the abrasive particles.

The vitrified hard glass portion of the bond consists of a lead oxide-boron glass. Lead compounds such as red lead ($Pb_3O_4$), lead peroxide ($PbO_2$) and litharge (PbO) have the property of forming glasses with compounds such as sodium tetraborate (borax) or boracic acid. These glasses fuse at relatively low temperatures in the range of 1200° F. The glasses so formed are hard vitrified substances. Such lead oxide-boron glasses efficiently wet diamond particles at relatively low temperatures and are found to provide excellent bonding. However, in an unmodified state while such glasses are relatively strong and hard, they are apt to be too friable and brittle when used as a binder; and glasses so formed, in proportions dictated by the vitrified diamond abrasive product art, are, moreover, of such a nature that slumping, deformation and running would occur.

I have found, however, that such lead oxide-boron glasses when tempered with insoluble silicates, for example in the form of certain clays, produce the desired ceramic bonds above described. The addition of the water insoluble silicates or clays to the lead oxide-boron glass and the maturation of this composition at temperatures below 1400° F., such, for example, as 1200° F., produces a compound bond which possesses the following properties vis-à-vis the final abrasive product and the glass bond portion itself: (a) the bond coating on the diamond abrasive particles is retained and provides such a balance between bond volume and diamond particle volume so that the hardness of the abrasive product is just sufficient to provide maximum durability without recourse to combustible pore forming materials; (b) the maturation temperature of the compound bond is below 1400° F., the lowest graphitization temperature of the diamond abrasive particles; (c) the wetting properties of the bond on the abrasive particles is enhanced due to the plasticity of the bond; (d) the addition of the silicates or clays to the glass provides a matrix for the glass which entirely eliminates slumping or bubbling of the bond; (e) the resulting bond is toughened so that the undesirable hereinabove described property of friability is eliminated; and (f) there results a property, of very great importance, namely, a cutting property of the abrasive product of such values that diamond abrasive products of the prior art do not approach even when the diamond volume in such prior art products is increased 100% over those described herein.

The added silicate or clay of this compound bond remains in substantially unaltered form, since the maturation temperature of the compound bond is far below the vitrifiable temperature of the silicate bond portion. However, the silicate material in the compound bond is so thoroughly wetted by the glass portion or component that a highly toughened complex results. The vitrifiable glass bond portion appears so unique in its wetting properties and adhesiveness that there results an extremely toughened bond product. This may be contrasted with the prior art use of clays with a fluxing agent. In such use the flux provides a plasticizing medium on the high melting point clays so that they fuse more readily to form a fused clay-flux aggregate. In such prior art use, the fluxes themselves are weak, are water attackable when uncombined with silicates, and are unsatisfactory bonds when used by themselves unless reacted with the silicates at temperatures far above the graphitization temperatures of diamond particles. By contrast, the glass portion or component of the bond of the present invention is a vitrified hard glass, is compounded with an unvitrified silicate portion at temperatures below the graphitization temperatures of the diamond particles, and the silicate portion or component forms or provides a well integrated matrix for the glass bond portion, the resulting compound bond possessing the properties described above.

The following are typical examples of the compounding of abrasive products such as abrasive wheels of the present invention.

Example I

The following is an example for the making of a 50% concentration diamond abrasive wheel; the ingredients by weight are as follows:

|  | Carats |
|---|---|
| 120 mesh diamond | 61.20 |
| 400 mesh $Al_2O_3$ | 139.39 |
| Borax | 26.32 |
| Kaolin | 32.96 |
| Red lead | 49.49 |
| Thermosetting resin | 30.00 |

The stated amount of diamond abrasive particles which is the primary abrasive is preferably first mixed with a secondary abrasive such as aluminum oxide ($Al_2O_3$). The bond comprising red lead and borax (to make the glass component or portion) and kaolin (to make the silicate component or portion) together with the thermosetting resin (functioning as a temporary binder), are mixed with the primary and secondary abrasives. This mix is molded to wheel size and shaped under heat and pressure, such, for example, as at a temperature of 315° F. and a pressure of 2000 pounds per square inch. This molded product is then fired at maturing temperatures of 1200° F. for a period of several hours. A fusion or maturing temperature of 1200° F. for a cycle of 24 hours ensures a uniformly fired product for an abrasive wheel of about on inch thickness. The temporary thermosetting resin bond is burned out in the process of firing. In the described example, the red lead, borax and kaolin are in the following proportions by weight—red lead 45.5%; borax 24.2%; and kaolin 30.3%. Lead peroxide and litharge may be used in place of red lead in this example.

In this example, the glass bond is formed by the combination of the lead oxide and the borax. This glass bond in the fused state wets the secondary abrasive particles, the kaolin and the primary abrasive particles. The glass is quite viscous at the highest temperature reached and little deformation results. The secondary abrasive and the silicate (kaolin) in the fired product have neither reacted nor gone into solution, but serve as a matrix for the glass bond.

Example II

Temporary binders other than thermosetting resins may be used, such, for example, as molasses or water. When a temporary binder such as molasses or water is used, a mix such as given with Example I (the thermosetting resin being, however, replaced by the other temporary binder) is pressed to shape, then dried, and then fired, using a firing cycle as described with Example I.

Example III

The following is an example of a diamond abrasive product for making a 25% concentration diamond:

|  | Carats |
|---|---|
| Diamond | 30.10 |
| 400 mesh $Al_2O_3$ | 154.59 |
| Borax | 29.75 |
| Kaolin | 37.19 |
| Red lead | 57.02 |
| Resin | 30.00 |

A mix having these ingredients is compounded in the same way as described in Example I.

The lead, borax and kaolin ingredients of the compound bond may be varied within wide limits. The following precautionary measures, however, are to be observed at the extremes of these limits—increasing the content of the borax too greatly produces a more brittle wheel and increases the shrinkage on firing; increasing the content of the kaolin too greatly produces the effect of presenting too much surface area for the glass component of the bond to wet, and, consequently, a softer wheel is obtained; increasing the content of the lead too greatly results in a maturing of the compound at a lower temperature. Where the borax and the lead are increased too greatly, separately or together, in proportion to the kaolin, a tendency to slumping is produced. Any one of these components may be varied with reference to the other two in the proportion of from 10% to 60%.

The proportions of the abrasive material and the bond material may be varied in the following range, the proportions being taken by weight—abrasive 30 to 55%; bond 45 to 70%. The primary and secondary abrasives may be varied in the following range of proportions—primary abrasive to secondary abrasive 1:1 to 1:5. The secondary abrasive may be any of the common abrasives employed in the manufacture of abrasive products. Aluminum oxide is found to be the most satisfactory to the attainment of the desired abrasive wheel. However, silicon carbide may also be used. Due to the detrimental effect which borax exerts on silicon carbide, smaller amounts of borax are recommended when this abrasive is employed; however, silicon carbide may be effectively used when the fluxing agent is other than borax.

For the water insoluble silicate there may be used in substitution for kaolin such materials as feldspar, quartz, magnesium silicate and asbestos.

The manufacture of ceramically bonded diamond abrasive products of the present invention and the properties of the diamond abrasive products produced thereby will in the main be fully apparent from the above detailed description thereof. Abrasive products made according to the recited examples and the variants thereof explained above are found to have the following broad properties the reasons for which have been explained above:

(1) A low temperature bond is produced which does not require an inert atmosphere for firing, the maturing temperatures being below the graphitization temperatures of the diamond particles.

(2) The bond is of the desired hardness and toughness above described, such that the diamond abrasive wheel is utilized to its fullest potential life.

(3) A fast free cutting wheel is produced which does not require the addition of any organic filler to be burned out to produce pore spaces.

(4) The produced wheels are noteworthy for the absence of loading (such wheels may be used for three weeks without the necessity of dressing).

(5) Using only 50% as many diamonds, the wheels are better than the best known porcellanic bonded wheels; and (6) Using only 50% as many diamonds as prior art ceramically bonded wheels, the wheels of the present invention show a much longer wear.

I claim:

1. A diamond abrasive product comprising diamond abrasive particles and a ceramic bond therefor matured at a temperature below the graphitization temperature of the diamond abrasive particles, said ceramic bond comprising two bond portions, namely, a vitrified fused hard glass portion consisting of a lead oxide-boron glass and an unvitrified silica portion selected from the group consisting of kaolin, feldspar, quartz, magnesium silicate, and asbestos, the boron component of the fused hard glass portion, the lead oxide component of the fused hard glass portion and the unvitrified silica portion component being in the following general proportions by weight 24%:46%:30% with each component being variable in amount with reference to the other two said components of from 10% to 60%, said unvitrified bond portion forming a matrix for said vitrified portion and the abrasive particles, and said vitrified portion being adhered to the unvitrified portion and the abrasive particles.

2. A diamond abrasive product comprising diamond abrasive particles, a secondary abrasive, and a ceramic bond therefor matured at a temperature below the graphitization temperature of the diamond abrasive particles, said ceramic bond comprising two bond portions namely, a vitrified fused hard glass portion consisting of a lead oxide-boron glass and an unvitrified silica portion selected from the group consisting of kaolin, feldspar, quartz, magnesium silicate, and asbestos, the boron component of the fused hard glass portion, the lead oxide component of the fused hard glass portion and the unvitrified silica portion component being in the following general proportions by weight 24%:46%:30% with each component being variable in amount with reference to the other two said components of from 10% to 60%, said unvitrified bond portion forming a matrix for said vitrified portion and the abrasive particles, and said vitrified portion being adhered to the unvitrified portion and the abrasive particles.

3. A diamond abrasive product comprising diamond abrasive particles and a ceramic bond therefor matured at temperatures in the range of 1200° F. to 1400° F., said ceramic bond comprising two bond portions, namely, a vitrified fused hard glass portion consisting of a lead oxide-boron glass vitrifiable below 1400° F. and an unvitrified silica portion vitrifiable substantially above 1400° F. selected from the group consisting of kaolin, feldspar, quartz, magnesium silicate, and asbestos, the boron component of the fused hard glass portion, the lead oxide component of the fused hard glass portion and the unvitrified silica portion component being in the following general proportions by weight

24%:46%:30% with each component being variable in amount with reference to the other two said components of from 10% to 60%, said unvitrified bond portion forming a matrix for said vitrified bond portion and said abrasive particles, and said vitrified portion being adhered to the unvitrified portion and the abrasive particles.

4. A diamond abrasive product comprising a primary abrasive of diamond abrasive particles, a secondary abrasive of aluminum oxide particles, and a ceramic bond therefor matured at temperatures in the range of 1200° F. to 1400° F., said ceramic bond comprising two bond portions, namely, a vitrified fused hard glass portion consisting of a lead oxide-boron glass vitrifiable below 1400° F. and an unvitrified silica portion vitrifiable at temperatures substantially above 1400° F. selected from the group consisting of kaolin, feldspar, quartz, magnesium silicate, and asbestos, the boron component of the fused hard glass portion, the lead oxide component of the fused hard glass portion and the unvitrified silica portion component being in the following general proportions by weight 24%:46%:30% with each component being variable in amount with reference to the other two said components of from 10% to 60%, said unvitrified bond portion forming a matrix for said vitrified bond portion and said abrasive particles, and said vitrified portion being adhered to the unvitrified portion and the abrasive particles.

5. The diamond abrasive product of claim 1 in which the abrasive and the ceramic bond are in the following range of proportions by weight: abrasive 30 to 55%; bond 45 to 70%.

6. The diamond abrasive product of claim 4 in which the abrasive and the ceramic bond are in the following range of proportions by weight: abrasive 30 to 55%; bond 45 to 70%, and in which the primary and secondary abrasives are in the following range of proportions: primary abrasive to secondary abrasive 1:1 to 1:5.

SIDNEY REED DE LANEY.

REFERENCES CITED

The following references are of record in the file of this patent:

UNITED STATES PATENTS

| Number | Name | Date |
|---|---|---|
| 104,231 | Van Kleeck | June 14, 1870 |
| 155,461 | Ott | Sept. 29, 1874 |
| 201,910 | Caesar | Feb. 5, 1878 |
| 733,082 | Sakurai | July 7, 1903 |
| 1,338,598 | Thomas | Apr. 27, 1920 |
| 2,038,690 | Taylor | Apr. 28, 1936 |
| 2,174,453 | Vuilleumier | Sept. 26, 1939 |
| 2,247,058 | Irby | June 24, 1941 |
| 2,259,468 | Houchins | Oct. 21, 1941 |
| 2,316,742 | Deyrup | Apr. 13, 1943 |
| 2,334,266 | Houchins | Nov. 16, 1943 |
| 2,420,644 | Athy | May 20, 1947 |

FOREIGN PATENTS

| Number | Country | Date |
|---|---|---|
| 1,140 | Great Britain | of 1856 |